Jan. 6, 1931.  E. L. WHITE  1,788,219

WAVE METER CIRCUIT

Filed April 21, 1927

INVENTOR.

Edwin L. White,

BY John B Brody

ATTORNEY.

Patented Jan. 6, 1931

1,788,219

UNITED STATES PATENT OFFICE

EDWIN L. WHITE, OF FORT SHAFTER, TERRITORY OF HAWAII, ASSIGNOR, BY MESNE ASSIGNMENTS, TO FEDERAL TELEGRAPH COMPANY, A CORPORATION OF CALIFORNIA

WAVE-METER CIRCUIT

Application filed April 21, 1927. Serial No. 185,539.

My invention relates broadly to frequency meters and more particularly to a precision type of frequency meter having self-calibration for maintaining the accuracy of the meter at all times.

One of the objects of my invention is to provide a frequency meter system having a piezo electric control circuit which may be intermittently operated when taking frequency observations for checking the accuracy of the meter and insuring accuracy in the readings of the meter.

Another object of my invention is to provide a circuit arrangement for a piezo electric crystal controlled frequency meter system with switching means in the output circuit of the frequency meter for rendering the piezo electric control effective or ineffective while taking observations by means of the frequency meter.

Figure 1:
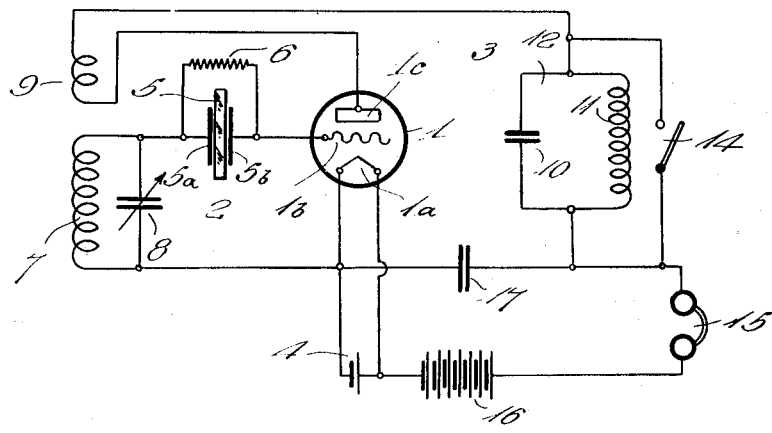
Figure 2:
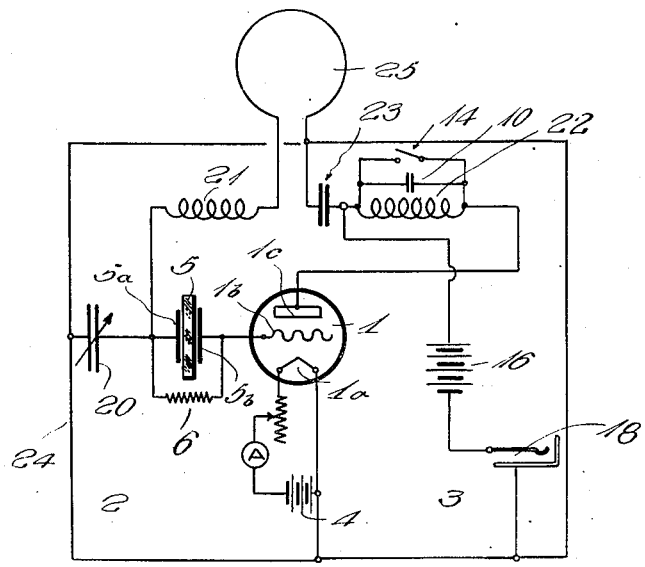

Other and further objects of my invention reside in the circuit arrangement for a piezo electric crystal controlled frequency meter as described in the following specification by reference to the accompanying drawings which diagrammatically show the frequency meter system and in which, Fig. 1 is a circuit diagram of the frequency meter system with the self-calibrating piezo electric crystal controlled circuit attached thereto; and Fig. 2 shows a modified form of piezo electric crystal controlled frequency meter circuit embodying the principles of my invention.

Referring to the drawings in more detail, reference character 1 designates an electron tube having filament electrode 1a, grid electrode 1b and plate electrode 1c arranged in input and output circuits designated at 2 and 3. The cathode 1a is heated from battery 4. A piezo electric crystal element 5 is provided in the input circuit connected between electrodes 5a and 5b and across these electrodes, a high resistance 6 is connected. The piezo electric crystal element is included in a tuned circuit constituted by inductance 7 and variable capacity 8. The output circuit 3 includes a winding 9 which is inductively coupled with the inductance 7 in the input circuit 2. The output circuit includes a tuned branch circuit 12 constituted by inductance 11 and the shunted capacity 10 adjusted to such value that the electron tube system will operate to sustain oscillations at the frequency of the piezo electric crystal element 5. The output circuit includes telephones 15 and high potential batteries 16 shunted by by-pass condenser 17. A switch 14 is provided for rendering the tuned branch circuit 12 effective or ineffective to sustain oscillations of the frequency of the piezo electric crystal element 5. The coupling between the circuit 7—8 and winding 9 is so adjusted that high frequency oscillations may be sustained. For purposes of illustrating the invention, it may be assumed that the piezo electric crystal element 5 is ground to a frequency of 50 kilocycles and the branch circuits 12 are adjusted to a corresponding frequency while the coupling circuits 7—8—9 respond to a frequency over a harmonic frequency range for example of 3,000 to 4,000 kilocycles. Inasmuch as the inductances 7 and 9 are small, the impedance to the low frequency oscillations of the piezo electric crystal element 5 is negligible and if the capacity 10 in branch circuit 12 is relatively large, the impedance to the high frequency oscillations developed by the coupled circuits 2—3 is negligible. For this reason the tube circuits may oscillate at the two frequencies simultaneously. As the high frequency circuit is tuned through harmonics of the low frequency oscillations, beat tones are heard in the telephones 15, that is to say, using the proportions referred to above, beat tones will be heard near 3,000, 3,050, 3,100, etc., kilocycles corresponding to the 60th, 61st, 62nd, etc., harmonics of the crystal oscillation. In view of the fact that the piezo electric crystal element 5 is permanent in its fundamental frequency and has definite harmonic frequencies, it provides a means of instantly calibrating the oscillator without requirement of any additional apparatus. By closing the switch 14 the crystal 5 will cease to oscillate. The high frequency circuit may be used as any other calibrated oscillator, either for the purposes of measurement or as a heterodyne or driver. It may become desirable, during the course of frequency measurements, to eliminate the beat tones. This may be readily accomplished by the closing of switch 14. Upon the opening of switch 14, however, the calibration of the meter is rapidly checked by the occurrence of beat tones for selected settings of the high frequency circuits.

In Fig. 2 I have shown a frequency meter circuit in which oscillations of predetermined frequencies may be sustained by means of the piezo electric crystal element 5 shunted by the resistance member 6. The entire circuit arrangement is electrostatically shielded as represented at 24. A pick-up loop 25 is illustrated as connected between the grid electrode 1b and plate electrode 1c, on the one side through inductance 21 and piezo electrocrystal element 5 and on the other side through condenser 23 and inductance element 22. Tuning condenser 20 is provided across the terminals of the pick-up loop 25 through the inductance 21. In the output circuit 3 a telephone jack 18 is provided to permit the plugging in of the telephone headset 15. The inductance elements 21 and 22 serve to couple the input and output circuits 2 and 3 for the establishment of oscillatory currents. The piezo electric crystal element 5 sustains oscillations of predetermined frequencies enabling frequency differences between the oscillating circuit, whose frequency is to be determined, and the harmonics of the crystal to be readily observed and checked.

It is necessary that the crystal be of relative low frequency in order that the points at which beat tones are heard may be close together. For example, in the range 3000 to 4000 kcs. with a 50 kcs. crystal only 21 points will be found. If a 100 kcs. crystal is used only 11 points will be found, and if a 500 kcs. crystal is used only 3 points. The beats occur between the frequency being determined and the harmonic frequencies of the piezo electric crystal The frequency meter of my invention has proven highly efficient in operation and practical in its construction.

While I have described my invention in certain of its preferred embodiments, I desire it to be understood that no limitations upon my invention are intended other than are imposed by the scope of the appended claims.

What I claim as new and desire to secure by Letters Patent of the United States is as follows:

1. A frequency meter comprising an electron tube having grid, cathode and plate electrodes, input and output circuits interconnecting said electrodes, a piezo electric crystal element including in said input circuit and ground to a predetermined frequency, means coupling said input and output circuits, and a branch circuit included in said output circuit and means for rendering said branch circuit effective to sustain oscillations corresponding to the fundamental frequency of said piezo electric crystal element or effective to permit oscillations corresponding to the harmonic frequencies of said piezo electric crystal element independently \of the fundamental frequency of oscillations sustained by said input and output circuits.

2. A frequency meter comprising an electron tube having coupled input and output circuits, a piezo electric crystal element connected in the input of said electron tube, a branched circuit connected in the output circuit of said electron tube, means for rendering said branched circuit effective or ineffective for correspondingly controlling the operation of said circuits to sustain the fundamental frequency of said crystal or the harmonic frequencies thereof, whereby said circuits operate to sustain independent oscillations determined by the fundamental and harmonic frequencies of said piezo electric crystal element for interaction with energy whose frequency is to be determined.

3. A frequency meter system comprising an electron tube having coupled input and output circuit for sustaining high frequency oscillations, a piezo electric crystal element ground to a relative low frequency and connected in said input circuit, an independent circuit arranged to be intermittently connected in or shunted out of said output circuit for sustaining oscillations corresponding to the fundamental frequency of said crystal when said input circuit is effective in said output circuit while permitting harmonic oscillations of said crystal when said circuit is shunted out and means for observing the harmonic frequencies developed by the interaction of the oscillations sustained by said piezo electric crystal element and the oscillations sustained by said coupled circuits.

4. A frequency meter comprising an electron tube having coupled input and output circuits arranged for the generation of high frequency oscillations, a piezo electric crystal element ground for low frequency oscillation and connected in said input circuit, a branched circuit connected in said output circuit for sustaining a frequency corresponding to the fundamental frequency of said piezo electric crystal element, switching means for rendering said branched circuit effective or ineffective and means for observing the frequency difference between the oscillations sustained by said coupled circuits and an oscillatory current whose frequency is to be determined.

5. A frequency meter comprising an electron tube having coupled input and output circuits for sustaining high frequency oscillations, a pair of parallel plates connected in said input circuit, a piezo electric crystal element ground to a predetermined frequency and positioned between said plates, a high resistance member connected across said plates in said input circuit, a branched circuit connected in series with said output circuit, said branched circuit including an inductance and capacity related to respond to a frequency of said piezo electric crystal element, switching means for shunting said branched circuit for sustaining harmonic frequencies of said crystal in said output circuit and means for observing the beat notes between the oscillations sustained by said coupled circuits and the oscillations derived from said piezo electric crystal element when said branched circuit is rendered effective for calibrating said frequency meter and observing the frequency difference between the oscillations sustained by said coupled circuits and the oscillations of a circuit whose frequency is to be determined.

In testimony whereof I affix my signature.

EDWIN L. WHITE.